US011268262B2

(12) United States Patent
Sizemore et al.

(10) Patent No.: US 11,268,262 B2
(45) Date of Patent: Mar. 8, 2022

(54) INTERCHANGEABLE MULTI-FUNCTION HANDLE FOR A WORK VEHICLE

(71) Applicant: CNH Industrial America LLC, New Holland, PA (US)

(72) Inventors: Terry B. Sizemore, Willowbrook, IL (US); Lorenzo Gomez, Schiller Park, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/787,477

(22) Filed: Feb. 11, 2020

(65) Prior Publication Data

US 2021/0246630 A1 Aug. 12, 2021

(51) Int. Cl.
| | | |
|---|---|---|
| *G05G 9/02* | (2006.01) | |
| *G05G 1/06* | (2006.01) | |
| *E02F 9/20* | (2006.01) | |
| *G05G 9/047* | (2006.01) | |
| *B60N 2/75* | (2018.01) | |

(52) U.S. Cl.
CPC .......... *E02F 9/2004* (2013.01); *B60N 2/797* (2018.02); *G05G 1/06* (2013.01); *G05G 9/04788* (2013.01); *G05G 2009/04774* (2013.01)

(58) Field of Classification Search
CPC ........ G05G 1/06; G05G 1/12; G05G 9/04788; G05G 2009/04703; G05G 2009/04774; E02F 9/2004; B60N 2/797
See application file for complete search history.

(56) References Cited

U.S. PATENT DOCUMENTS

| | | | | |
|---|---|---|---|---|
| 6,038,937 A | * | 3/2000 | Van Order ............ | F16H 59/105 |
| | | | | 200/61.85 |
| 6,145,401 A | | 11/2000 | Brush et al. | |
| 6,450,278 B1 | * | 9/2002 | Shirogami ............ | E02F 9/2004 |
| | | | | 180/315 |
| 7,059,680 B2 | * | 6/2006 | Billger ................. | B60N 2/0224 |
| | | | | 297/344.22 |
| 7,458,439 B2 | | 12/2008 | Catton et al. | |

(Continued)

FOREIGN PATENT DOCUMENTS

| | | |
|---|---|---|
| CN | 202267888 U | 6/2012 |
| EP | 1 568 651 A2 | 8/2005 |
| WO | 2012/113991 A1 | 8/2012 |

OTHER PUBLICATIONS

"Ergonomics and the Development of Agricultural Vehicles", W. Kyle Dooley, Ergonomics Centre of Excellence, Case New Holland, Burr Ridge, Illinois, ASABE Distinguished Lecture Series No. 36, Feb. 2012 (12 pages).

*Primary Examiner* — Adam D Rogers
(74) *Attorney, Agent, or Firm* — Rickard K. DeMille; Rebecca L. Henkel

(57) ABSTRACT

A handle assembly for an armrest control console of a steering system of a work vehicle. The handle assembly includes a base member, a hand-receiving member, and an electro-mechanical connection located in between the base member and the hand-receiving member. The electro-mechanical connection detachably connects the hand-receiving member to the base member such that the hand-receiving member is rigidly supported by and electrically coupled with the base member. The electro-mechanical connection is located exterior to the armrest control console.

5 Claims, 5 Drawing Sheets

(56) References Cited

U.S. PATENT DOCUMENTS

| | | | |
|---|---|---|---|
| 7,635,045 | B2 | 12/2009 | Shearer et al. |
| 7,757,579 | B2 | 7/2010 | Bloch et al. |
| 8,151,928 | B2 * | 4/2012 | States .................... G01D 5/145 |
| | | | 180/315 |
| 8,806,980 | B2 * | 8/2014 | Hermansson ............ G05G 1/06 |
| | | | 74/548 |
| 9,382,692 | B2 * | 7/2016 | Sakatani ................... E02F 9/16 |
| 10,077,543 | B2 | 9/2018 | Heinzmann et al. |
| 10,120,407 | B2 | 11/2018 | Niguet et al. |
| 2006/0007144 | A1 | 1/2006 | Mathiasen et al. |
| 2006/0053925 | A1 | 3/2006 | Merletti et al. |
| 2009/0139360 | A1 | 6/2009 | Diccion |
| 2014/0033857 | A1 * | 2/2014 | Currier ................... G05G 1/12 |
| | | | 74/553 |
| 2014/0090504 | A1 * | 4/2014 | Huth .................. F16H 59/0278 |
| | | | 74/473.19 |

* cited by examiner

INTERCHANGEABLE MULTI-FUNCTION HANDLE FOR A WORK VEHICLE

BACKGROUND OF THE INVENTION

The present invention pertains to work vehicles and, more specifically, to a multifunction handle for a work vehicle.

A work vehicle, such as a tractor, combine harvester, or backhoe, typically includes a chassis, wheels or tracks, a prime mover, and a cab supported by the chassis. The work vehicle may also include an operator control system inside of the cab. Hence, the operator may steer or otherwise control the functionality of work vehicle while being comfortably seated within the cab.

Generally, the operator control system includes a user interface and/or other user inputs such as handles, levers, buttons, switches, etc. For example, the operator control system may include an armrest control console that has an armrest and a multifunction handle with multiple user inputs thereon for allowing the operator to efficiently and comfortably operate the work vehicle. The multifunction handle is typically movable relative to the armrest. The multifunction handle is also generally integrated within the body of the armrest. Therefore, since the armrest and multifunction handle are integrated as a singular unit, the multifunction handle may not be replaceable without replacing the entire armrest control console.

In known armrest control consoles, the multifunction handle is designed as a general one-size-fits-all handle; and thus, the multifunction handle is not specifically tailored to each operator. Thereby, the ergonomic configuration of the general multifunction handle may meet the preferences of some operators while failing to meet the preferences of other operators who prefer a different size, angle, and/or user input layout. If an operator wishes to change the style of the multifunction handle, the operator must generally replace the entire armrest control console. As can be appreciated, changing the entire armrest control console may be costly and impractical.

What is needed in the art is an interchangeable multifunction handle for an armrest control console.

SUMMARY OF THE INVENTION

In one exemplary embodiment formed in accordance with the present invention, there is provided a handle assembly for an armrest control console of a steering system of a work vehicle. The handle assembly includes a base member, a hand-receiving member, and an electro-mechanical connection located in between the base member and the hand-receiving member. The electro-mechanical connection detachably connects the hand-receiving member to the base member such that the hand-receiving member is rigidly supported by and electrically coupled with the base member. The electro-mechanical connection is located exterior to the armrest control console such that the hand-receiving member can be easily interchanged without replacing the entire steering system.

In another exemplary embodiment formed in accordance with the present invention, there is provided a handle assembly for a steering system of a work vehicle. The steering system includes an armrest control console. The handle assembly includes a base member configured for connecting to the armrest control console, a hand-receiving member configured for receiving a hand of a user and for being interchangeable, and an electro-mechanical connection located in between the base member and the hand-receiving member. The electro-mechanical connection detachably connects the hand-receiving member to the base member such that the hand-receiving member is rigidly supported by and electrically coupled with the base member. The electro-mechanical connection is configured for being exterior to the armrest control console.

In yet another exemplary embodiment formed in accordance with the present invention, there is provided a work vehicle that includes a chassis, a cab supported by the chassis, and a steering system located within the cab. The steering system includes an armrest control console and a handle assembly. The handle assembly includes a base member connected to the armrest control console, a hand-receiving member configured for receiving a hand of a user and for being interchangeable, and an electro-mechanical connection located in between the base member and the hand-receiving member. The electro-mechanical connection detachably connects the hand-receiving member to the base member such that the hand-receiving member is rigidly supported by and electrically coupled with the base member. The electro-mechanical connection is exterior to the armrest control console.

In yet another exemplary embodiment formed in accordance with the present invention, there is provided a method for configuring a steering system. The method includes providing an armrest control console and a handle assembly. The handle assembly includes a base member connected to the armrest control console, a first hand-receiving member configured for receiving a hand of a user and for being interchangeable, and an electro-mechanical connection located in between the base member and the hand-receiving member. The electro-mechanical connection detachably connects the hand-receiving member to the base member such that the hand-receiving member is rigidly supported by and electrically coupled with the base member. The electro-mechanical connection is exterior to the armrest control console. The method also includes providing a second hand-receiving member which is different than the first hand-receiving member. The method also includes interchanging, by a user, the first hand-receiving member with the second hand-receiving member by: disconnecting the first hand-receiving member from the base member, and connecting the second hand-receiving member to the base member.

One possible advantage of the exemplary embodiment of the work vehicle is that the hand-receiving member of the multifunction handle assembly may be easily and quickly interchanged with another hand-receiving member in order to meet the preferences of the operator.

Another possible advantage of the exemplary embodiment of the work vehicle is that the hand-receiving member of the multifunction handle assembly is interchangeable without needing to dissemble the entire armrest control console.

Yet another possible advantage of the exemplary embodiment of the work vehicle is that the most expensive parts of the detachable multifunction handle, such as the friction pack and sensors, are kept within the armrest member, which significantly reduces the overall cost of the interchangeable hand-receiving members.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
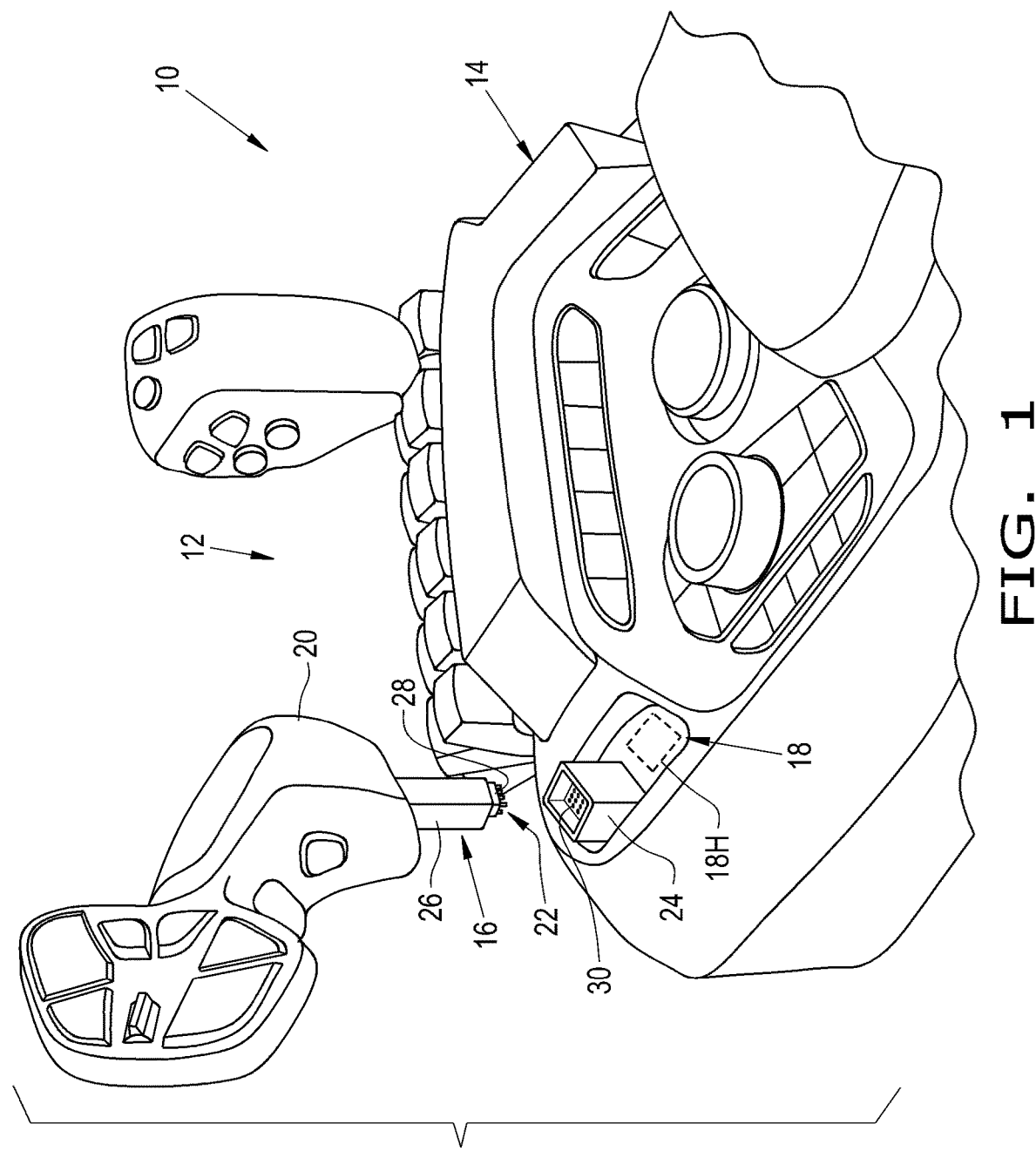
FIG. 1 illustrates a perspective view of a steering system of a work vehicle, the steering system includes an armrest control console and a multifunction handle assembly, and the handle assembly includes a base member, a hand-receiving member, and an electro-mechanical connection, in accordance with an exemplary embodiment of the present invention.

Referring now to the drawings, and more particularly to FIG. 1, there is shown a work vehicle 10 that includes a chassis, a prime mover, wheels, a cab supported by the chassis, and a steering system 12 located within the cab. The work vehicle 10 may be in the form of any desired work vehicle, such as an agricultural tractor, combine, self-propelled windrower, or backhoe. The steering system 12 may comprise an armrest control console 14 and a handle assembly 16 that may be readily tailored to a user's preferences. The steering system 12 may be used by the operator to control any desired operation of the work vehicle 10.

The armrest control console 14 is located inside the cab adjacent to the user's chair. The armrest control console 14 may movably mount the handle assembly 16. The armrest control console 14 may include an armrest section for receiving at least a portion of the user's arm. The armrest control console 14 may include any desired user input or interface, such as a touch screen and/or one or more buttons, dials, levers, etc. It should be appreciated that the armrest control console 14 may be in the form of any desired control console 14.

The handle assembly 16 may be slidably mounted onto the armrest control console 14 in a designated track. The handle assembly 16 may constitute a multifunction handle which allows the user to operate any desired function of the work vehicle 10. The handle assembly 16 may generally include a base member 18, a hand-receiving member 20, and an electro-mechanical connection 22 for removably attaching the hand-receiving member 20 to the base member 18. In this regard, the handle assembly 16 may be considered a split multifunction handle with a base member 18 rigidly connected to the armrest control console 14 and an upper, interchangeable hand-receiving member 20 removably connected to the base member 18. As discussed further herein, the user may easily interchange the hand-receiving member 20 with another differing hand-receiving member.

The base member 18 is slidably connected to the armrest control console 14. The base member 18 has the electronic hardware 18H of the handle assembly 16. For instance, the base member 18 may include electronic hardware 18H comprising an electrical processing circuit or control unit, a friction pack, and/or various other electrical components. Any desired portion of the base member 18 may be integrated into the armrest control console 14. Thereby, the electronic hardware 18H of the handle assembly 16 remains coupled to and/or integrated within the armrest control console 14 such that only hand-receiving member 20 needs be changed to meet the user's preferences. The base member 18 may further comprise a housing portion for housing the electronic hardware 18H. The base member 18 may comprise any desired shape and material.

The hand-receiving member 20 is configured for receiving a hand of the user. Each hand-receiving member 20 has a unique ergonomic configuration. As used herein, the phrase ergonomic configuration may encompass a particular body-type, size, shape, angle, button layout, and/or feature of the hand-receiving member 20. The hand-receiving member 20 may include one or more user inputs, e.g. buttons. The hand-receiving member 20 does not include the electronic hardware 18H of the handle assembly 16. The hand-receiving member 20 may comprise any desired material.

The electro-mechanical connection 22 rigidly and electrically couples the hand-receiving member 20 with the base member 18. The electro-mechanical connection 22 is a split-stem connection 22 that has a first mating feature 24 located on the base member 18, a second mating feature 26 located on the hand-receiving member 20 for mating with the first mating feature 24, a first wiring harness connecting portion 28 located on the base member 18, and a second wiring harness connecting portion 30 located on the hand-receiving member 20 for connecting to the first wiring harness connecting portion 28. The electro-mechanical connection 22 is located in between the base member 18 and the hand-receiving member 20 for detachably connecting the hand-receiving member 20 to the base member 18. The electro-mechanical connection 22 is exterior to the armrest control console 14. More particularly, the electro-mechanical connection 22 is located above the top surface of the armrest control console 14 such that the hand-receiving member 20 is easily interchangeable without replacing the base member 18 and/or the armrest control console 16. As shown in FIG. 1, the first mating feature 24 is a lower, female stem section 24, which may or may not include one or more grooves and/or ridges, and the second mating feature 26 is an upper, male stem section 26, which may or may not include one or more corresponding protrusions and/or detents. The first and second wiring harnesses 28, 30 may be in the form of female and male electrical wiring harnesses 28, 30, respectively. The first and second wiring harnesses 28, 30 may be in the form of any desired electrical connectors. As can be appreciated, the electro-mechanical connection 20 may comprise any desired shape, size, and material.

Figure 2:
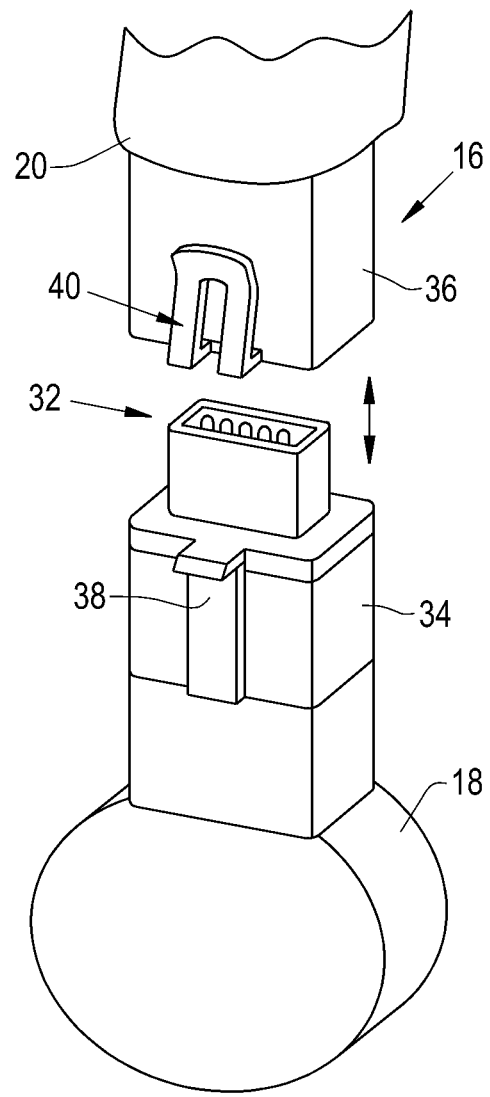
FIG. 2 illustrates a perspective view of another embodiment if an electro-mechanical connection of the handle assembly, in accordance with an exemplary embodiment of the present invention.

Referring now to FIG. 2, there is shown another embodiment of an electro-mechanical connection 32 of the handle assembly 16, which may be substantially similar to the electro-mechanical connection 22 except that the first mating feature 34 is a lower male stem section 34 and the second mating feature 36 is an upper female stem section 36 that receives and encompasses the male stem section 34. The male stem section 34 may include a protrusion 38, e.g. a raised rectangular block member 38, and the female stem section 36 may include a receiving slot 40 that receives the protrusion 38. Additionally, the electro-mechanical connection 32 may include a locking feature, such as a tab, clasp, fastener, etc., which selectively locks the mating features 34, 36 together.

Figure 3:
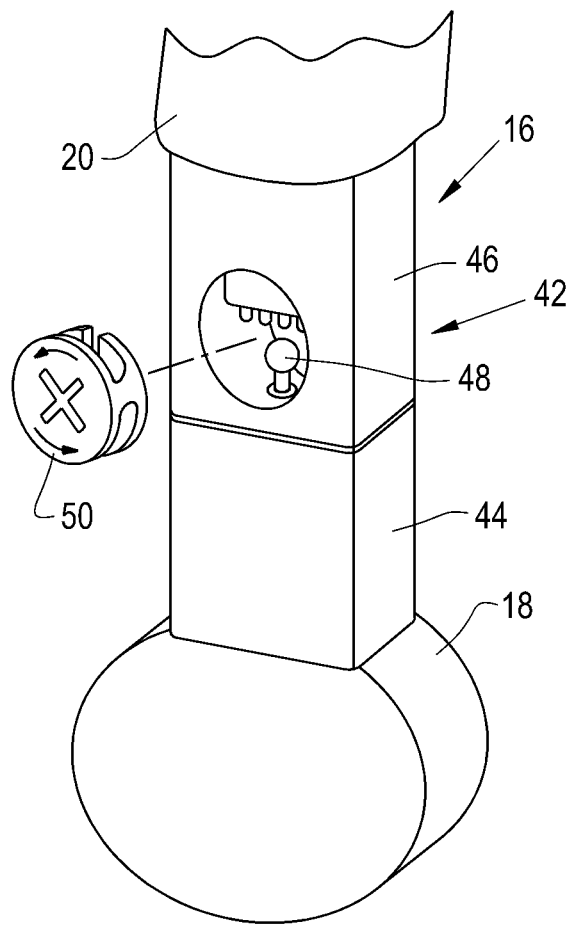
FIG. 3 illustrates a perspective view of another embodiment if an electro-mechanical connection of the handle assembly, in accordance with an exemplary embodiment of the present invention.

Referring now to FIG. 3, there is shown another embodiment of an electro-mechanical connection 42 of the handle assembly 16, which may be substantially similar to the electro-mechanical connection 22 except that the first and second mating features 44, 46 do not overlap with one another in a male-female-type connection. The lower stem 44 may include a hitch mount 48, e.g. hitch ball 48, that extends upwardly into the inside of the upper stem 46. The upper stem 46 may include a receiving hole (unnumbered) and a cam lock nut 50 that is insertable within the receiving hole and engageable with the hitch mount 48. Thereby, the cam lock nut 50 may dually secure and lock the mating features 44, 46 together.

Figure 4:
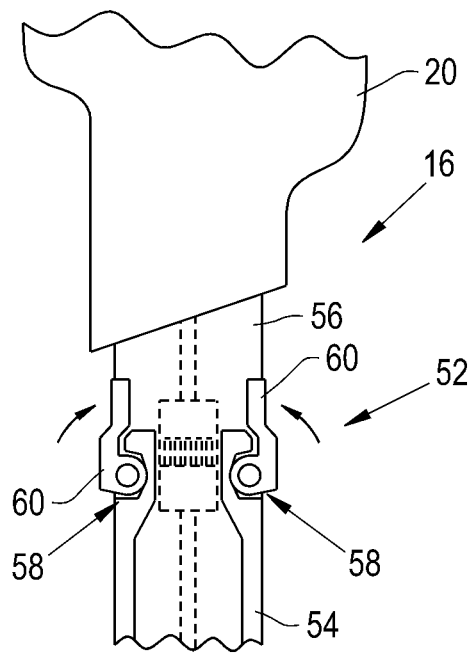
FIG. 4 illustrates a side view of another embodiment if an electro-mechanical connection of the handle assembly, in accordance with an exemplary embodiment of the present invention.

Referring now to FIG. 4, there is shown a side view of another embodiment of an electro-mechanical connection 52 of the handle assembly 16, which may be substantially similar to the electro-mechanical connection 32. The lower male stem section 54 fits within the upper female stem section 56. The lower male section 54 includes has a pair of detents 58, and the upper female section 56 includes a pair of cam lock lever arms 60. In operation, a user may connect the hand-receiving member 20 with the base member 18 by fitting the upper female stem section 56 over the lower male section 54 and rotating the cam lock lever arms 60 in order to engage the bulbous ends of the cam lock lever arms 60 with the detents 58. Thereby, the cam lock lever arms 60 may dually secure and lock the mating features 54, 56 together.

Figure 5:
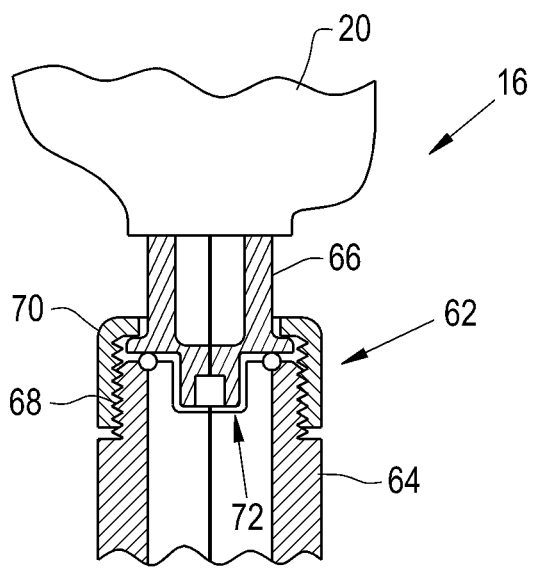
FIG. 5 illustrates a perspective view of another embodiment if an electro-mechanical connection of the handle assembly, in accordance with an exemplary embodiment of the present invention.
Figure 6:
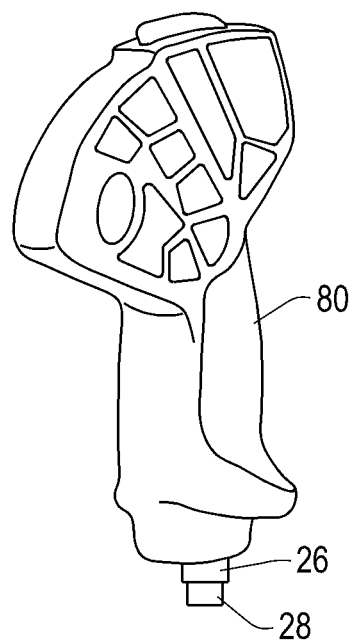
FIG. 6 illustrates a perspective view of another embodiment of a hand-receiving member of the handle assembly, in accordance with an exemplary embodiment of the present invention, in accordance with an exemplary embodiment of the present invention.
Figure 7:
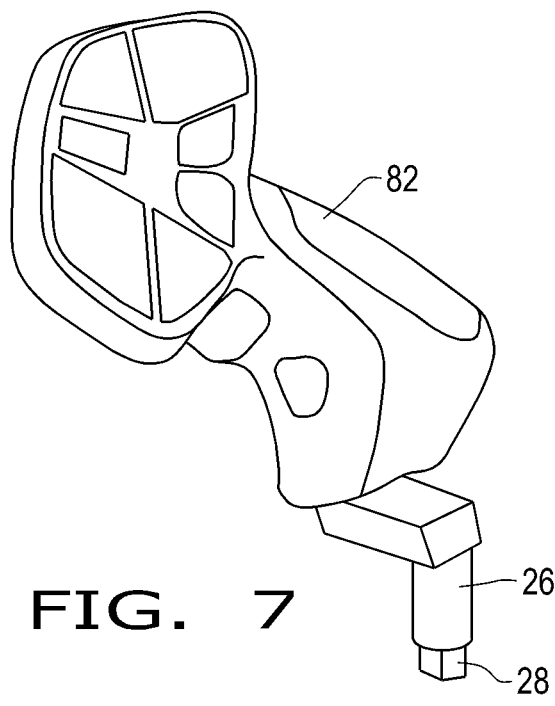
FIG. 7 illustrates a perspective view of another embodiment of a hand-receiving member of the handle assembly, in accordance with an exemplary embodiment of the present invention, in accordance with an exemplary embodiment of the present invention.
Figure 8:
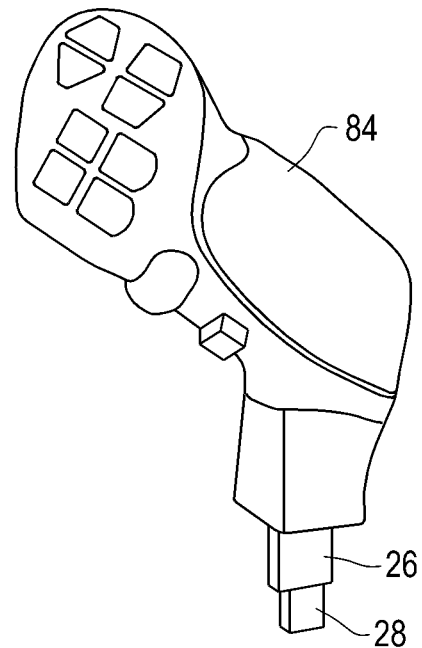
FIG. 8 illustrates a perspective view of another embodiment of a hand-receiving member of the handle assembly, in accordance with an exemplary embodiment of the present invention, in accordance with an exemplary embodiment of the present invention.

Referring now to FIG. 5, there is shown a cross-sectional view of another embodiment of an electro-mechanical connection 62 of the handle assembly 16 which additionally includes a hydraulic connection 72 integrated into the structure of the electro-mechanical connection 62. Thereby, the connection 62 may be in the form of an electro-hydro-mechanical connection which generally includes a first mating feature 64, e.g. lower stem section 64, and a second mating feature 66, e.g. an upper stem section 66. The lower stem section 64 may include a threaded portion 68 at its outer periphery. The upper stem section 66 may include an internally threaded nut 70 that fits at least partially around the bottom of the stem section 66 and the top of the lower stem section 64. The nut 70 is selectively engageable with the threaded portion 68 for securing the hand-receiving member 20 to the base member 18. As can be appreciated, the user may screw or unscrew the nut 70 by hand or through use of a designated tool. Thereby, the nut 70 may dually secure and lock the mating features 64, 66 together.

Referring now collectively to FIGS. 1-8, there is shown possible embodiments of hand-receiving members 80, 82, 84 which are all compatible with base member 18 via the electro-mechanical connection 22. Thereby, the user may easily interchange or swap hand-receiving members 20, 80, 82, 84 to match the unique ergonomic configuration of the particular hand-receiving member 20, 80, 82, 84 with the user's subjective preferences. For example, the user may interchange the tilted hand-receiving member 20 with a straight hand-receiving member 80, a forwardly extended hand-receiving member 82, or a hand-receiving member 84 with a different button layout. It is noted that the any one of the hand-receiving members 20, 80, 82, 84 may be paired with any one of the electro-mechanical connections 22, 32, 42, 52, 62, as described above, for removably connecting any desired hand-receiving member 20, 80, 82, 84 to any desired base member 18.

Figure 9:
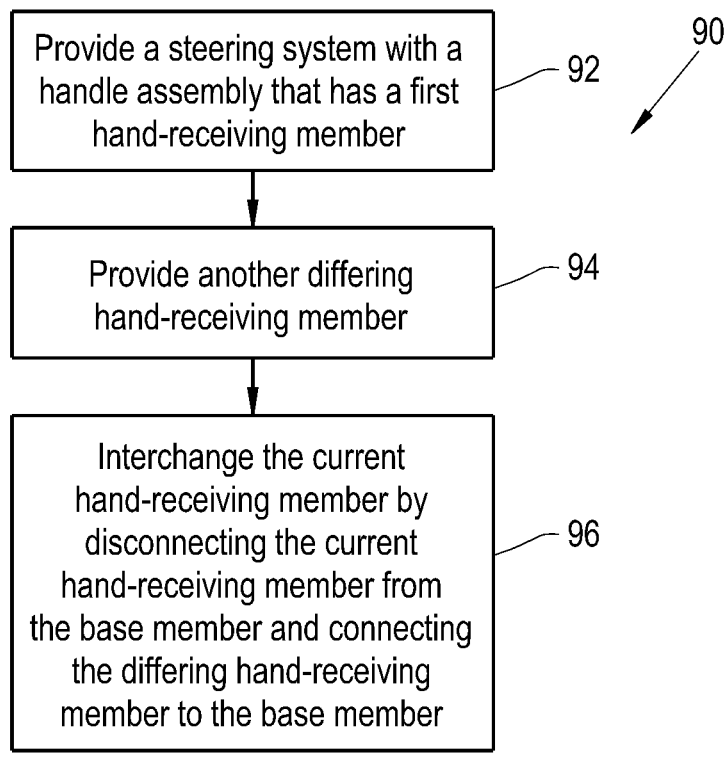
FIG. 9 illustrates a flowchart of a method for interchanging hand-receiving members of the handle assembly to configure the handle assembly to the preferences of the user, in accordance with an exemplary embodiment of the present invention.

Referring now to FIG. 9, there is shown a method 90 for interchanging hand-receiving members 20, 80, 82, 84 of the handle assembly 16 to reconfigure the handle assembly 16 in order to meet the user's preferences. The method 90 includes an initial step of providing a steering system 12 with the armrest control console 14 and the handle assembly 16 (at block 92). The handle assembly 16 includes the first, current hand-receiving member 20, 80, 82, 84. The method 90 may include another step of providing a second, differing hand-receiving member 20, 80, 82, 84 which has a different ergonomic configuration than the current hand-receiving member 20, 80, 82, 84 (at block 94). It should be appreciated that the handle assembly 16 may include any desired hand-receiving member 20, 80, 82, 84 and electro-mechanical connection 22, 32, 42, 52, 62, as discussed above. Then, the user may interchange the current hand-receiving member 20, 80, 82, 84 with the differing hand-receiving member 20, 80, 82, 84 (at block 96). This step may include disconnecting the current hand-receiving member 20 from the base member 18, and subsequently connecting the differing hand-receiving member 80, 82, 84 to the base member 18. Thus, given the external electro-mechanical connection 22, 32, 42, 52, 62, the user may easily (dis)connect the hand-receiving members 20, 80, 82, 84 to the same base member 18.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A handle assembly for a steering system of a work vehicle, the steering system comprising an armrest control console, the handle assembly comprising:

a base member configured for connecting to the armrest control console;

a hand-receiving member configured for receiving a hand of a user and for being interchangeable;

an electro-mechanical connection located in between the base member and the hand-receiving member, the electro-mechanical connection detachably connecting the hand-receiving member to the base member such that the hand-receiving member is rigidly supported by and electrically coupled with the base member, and the electro-mechanical connection is configured for being exterior to the armrest control console, wherein the electro-mechanical connection is a split-stem connection comprising a first mating feature located on the base member and comprising a hitch mount, a second mating feature comprising a cam lock nut, the second mating feature being located on the hand-receiving member for mating with the first mating feature, a first wiring harness connecting portion located on the base member, and a second wiring harness connecting portion located on the hand-receiving member for connecting to the first wiring harness connecting portion; and wherein the hand-receiving member comprises an ergonomic configuration, and the hand-receiving member is configured for being interchangeable with another hand-receiving member comprising a different ergonomic configuration, and wherein the base member comprises electronic hardware, and the hand-receiving member comprises user input hardware.

2. A handle assembly for a steering system of a work vehicle, the steering system comprising an armrest control console, the handle assembly comprising:

a base member configured for connecting to the armrest control console;

a hand-receiving member configured for receiving a hand of a user and for being interchangeable;

an electro-mechanical connection located in between the base member and the hand-receiving member, the electro-mechanical connection detachably connecting the hand-receiving member to the base member such that the hand-receiving member is rigidly supported by and electrically coupled with the base member, and the electro-mechanical connection is configured for being exterior to the armrest control console, wherein the electro-mechanical connection is a split-stem connection comprising a first mating feature located on the base member and comprising a pair of detents, and a second mating feature located on the hand-receiving member and comprising a pair of cam lock lever arms for respectively engaging the pair of detents, a first wiring harness connecting portion located on the base member, and a second wiring harness connecting portion located on the hand-receiving member for connecting to the first wiring harness connecting portion; and wherein the hand-receiving member comprises an ergonomic configuration, and the hand-receiving member is configured for being interchangeable with another hand-receiving member comprising a different ergonomic configuration, and wherein the base member comprises electronic hardware, and the hand-receiving member comprises user input hardware.

3. A handle assembly for a steering system of a work vehicle, the steering system comprising an armrest control console, the handle assembly comprising:

a base member configured for connecting to the armrest control console;

a hand-receiving member configured for receiving a hand of a user and for being interchangeable;

an electro-mechanical connection located in between the base member and the hand-receiving member, the electro-mechanical connection detachably connecting the hand-receiving member to the base member such that the hand-receiving member is rigidly supported by and electrically coupled with the base member, and the electro-mechanical connection is configured for being exterior to the armrest control console, wherein the electro-mechanical connection is a split-stem connection comprising a first mating feature located on the base member, a second mating feature located on the hand-receiving member for mating with the first mating feature, a first wiring harness connecting portion located on the base member, and a second wiring harness connecting portion located on the hand-receiving member for connecting to the first wiring harness connecting portion, wherein the electro-mechanical connection further comprises a hydraulic connection, and the first mating feature comprises a threaded portion of an outer periphery of the base member, and the second mating feature comprises a nut which is selectively engageable with the threaded portion for securing the hand-receiving member to the base member; and wherein the hand-receiving member comprises an ergonomic configuration, and the hand-receiving member is configured for being interchangeable with another hand-receiving member comprising a different ergonomic configuration, and wherein the base member comprises electronic hardware, and the hand-receiving member comprises user input hardware.

4. A work vehicle, comprising:

a chassis;

a cab supported by the chassis; and a steering system located within the cab and comprising an armrest control console and a handle assembly, the handle assembly comprising:

a base member connected to the armrest control console;

a hand-receiving member configured for receiving a hand of a user and for being interchangeable; and an electro-mechanical connection located in between the base member and the hand-receiving member, the electro-mechanical connection detachably connecting the hand-receiving member to the base member such that the hand-receiving member is rigidly supported by and electrically coupled with the base member, and the electro-mechanical connection being exterior to the armrest control console, wherein the electro-mechanical connection is a split-stem connection comprising a first mating feature located on the base member and comprising a hitch mount, a second mating feature comprising a cam lock nut, the second mating feature being located on the hand-receiving member for mating with the first mating feature, a first wiring harness connecting portion located on the base member, and a second wiring harness connecting portion located on the hand-receiving member for connecting to the first wiring harness connecting portion; and wherein the hand-receiving member comprises an ergonomic configuration, and the hand-receiving member is configured for being interchangeable with another hand-receiving member comprising a different ergonomic configuration, and wherein the base member comprises electronic hardware, and the hand-receiving member comprises user input hardware.

5. The work vehicle of claim 4, wherein the armrest control console comprises a top surface, and the electro-mechanical connection of the handle assembly is located above the top surface of the armrest control console such that the hand-receiving member is interchangeable without replacing the armrest control console.

* * * * *